United States Patent [19]
Meyer, Jr. et al.

[11] Patent Number: 5,581,024
[45] Date of Patent: Dec. 3, 1996

[54] DOWNHOLE DEPTH CORRELATION AND COMPUTATION APPARATUS AND METHODS FOR COMBINING MULTIPLE BOREHOLE MEASUREMENTS

[75] Inventors: Wallace H. Meyer, Jr., Spring; Ronald J. Deady, Houston; Macmillan M. Wisler, Kingwood, all of Tex.

[73] Assignee: Baker Hughes Incorporated, Houston, Tex.

[21] Appl. No.: 326,829

[22] Filed: Oct. 20, 1994

[51] Int. Cl.$^6$ .................................................. E21B 49/00
[52] U.S. Cl. ................... 73/152.03; 364/422; 73/152.44
[58] Field of Search ................................. 73/152, 151.5; 364/422

[56] References Cited

U.S. PATENT DOCUMENTS

| | | | |
|---|---|---|---|
| 3,209,323 | 9/1965 | Grossman, Jr. | 340/853.3 |
| 3,590,228 | 6/1971 | Burke | 364/422 |
| 3,638,484 | 2/1972 | Tixier | 73/152 |
| 3,720,912 | 3/1973 | Schmidt | 367/27 |
| 3,721,960 | 3/1973 | Tinch et al. | 73/152 |
| 4,276,599 | 6/1981 | Timmons et al. | 364/422 |
| 4,297,879 | 11/1981 | Howells et al. | 73/152 |
| 4,310,887 | 1/1982 | Suau | 364/422 |
| 4,320,469 | 3/1982 | Frawley et al. | 364/422 X |
| 4,327,412 | 4/1982 | Timmons et al. | 364/422 |
| 4,541,275 | 9/1985 | Kerzner | 73/152 |
| 4,556,884 | 12/1985 | Howells et al. | 73/152 X |
| 4,697,650 | 10/1987 | Fontenot | 73/151.5 |
| 4,833,914 | 5/1989 | Rasmus | 73/152 |
| 5,064,006 | 11/1991 | Waters et al. | 175/45 |
| 5,065,099 | 11/1991 | Sinclair et al. | 324/339 |
| 5,230,387 | 7/1993 | Waters et al. | 175/45 |
| 5,250,806 | 10/1993 | Rhein-Knudsen et al. | 250/254 |
| 5,282,133 | 1/1994 | Watson | 364/422 |
| 5,321,982 | 6/1994 | Fay et al. | 73/151.5 |
| 5,329,235 | 7/1994 | Zhou et al. | 324/338 |
| 5,332,048 | 7/1994 | Underwood et al. | 175/26 |
| 5,377,105 | 12/1994 | Smith | 73/152 X |

*Primary Examiner*—Michael Brock
*Attorney, Agent, or Firm*—Paul S. Madan

[57] ABSTRACT

The current invention is directed toward the use of a downhole computer and downhole storage within a measurement-while-drilling (MWD) downhole subassembly to process data from the response of a plurality of sensors of different classes or one or more sensors of the same class which exhibit different measure points and vertical resolutions. Classes or types of sensors applicable to the invention include, but are not limited to, electromagnetic, acoustic, and nuclear. Sensor measurements are made essentially simultaneously. In combining downhole responses from one or more sensors to obtain parameters of interest, a critical prerequisite is downhole depth correlation and vertical resolution matching of all sensor responses prior to combination. Methods and apparatus are disclosed for performing these critical functions within the limits of telemetry and downhole storage capacities of current MWD systems, Alternate embodiments of the invention include wireline operations in which telemetry band width is limited by components such as single conductor logging cables employed in logging wells under high pressure.

29 Claims, 6 Drawing Sheets

DOWNHOLE DEPTH CORRELATION AND COMPUTATION APPARATUS AND METHODS FOR COMBINING MULTIPLE BOREHOLE MEASUREMENTS

This disclosure is directed in general toward the determination of geophysical and other parameters of interest by combining multiple sensor measurements obtained from within a borehole. Alternate embodiments of the invention include wireline operations in which telemetry capacity may be limited. The sensors are preferably axially spaced within a downhole subassembly which is located near the drill bit and is conveyed within the borehole with the drill string. Sensor responses are first correlated to a common depth reference and vertical resolution values, and then combined to obtain parameters of interest using downhole computing means. This disclosure is directed more specifically toward methods of depth correlation of multiple axially spaced sensors, vertical resolution matching of these sensors, and the combination of multiple sensor responses to obtain downhole computations of parameters of interest. In one embodiment of the invention, computations are controlled for changing formation and borehole environmental conditions using commands from the surface. Computed parameters of interest are then telemetered to the surface in real time or stored downhole for subsequent retrieval. Briefly stated, downhole depth correlation and resolution matching is a necessary precursor to meaningful downhole computations involving multiple sensor responses. Although the invention is directed toward measurements which are made while drilling a borehole, the concepts are applicable to other operations such as wireline logging.

BACKGROUND OF THE INVENTION

Various embodiments of electromagnetic, nuclear and acoustic measurements have been made for many years to determine geophysical properties of earth formations penetrated by a borehole. These measurements are usually displayed as a function of depth within the borehole at which they were measured forming a display known in the industry as a "log" of the borehole. The log of spontaneous potential of earth formations penetrated by a borehole was made in 1927 using a wireline device. In the following decades, borehole measurements using wireline devices were expanded to include nuclear and acoustic measurements, as well as more sophisticated electromagnetic measurements, to determine additional geophysical parameters of interest, and to also determine certain properties of the borehole.

In the late 1960's and early 1970's, two or more wireline sensor responses were combined to obtain parametric measurements which were more accurate than measurements from either single sensor, and to obtain measures of additional parameters not obtainable from the response of either single sensor. As an example, measures of the acoustic travel time of the formation was combined with a measure of formation porosity derived from a scattered gamma ray device to obtain not only an improved measure of formation porosity but an indication of the lithology of the formation not obtainable from the response of either individual measurement. U.S. Pat. No. 3,590,228 to Jack A. Burke teaches the combination of neutron porosity, formation density and acoustic travel time wireline logs to obtain an improved formation porosity measurements and fractional components of as many as three minerals. U.S. Pat. No. 3,638,484 to Maurice P. Tixier teaches the combination of neutron porosity, formation density, acoustic travel time, natural gamma radiation, spontaneous potential and resistivity wireline logs to obtain even more formation information including effective and shale fraction porosity. The first such combining "combination" logs were generated from individual logs, each being made with a given type of downhole sensor and an individual pass within the borehole. As the technology matured, multiple sensors of different types were combined within a single downhole instrument thereby allowing the input parameters of the combination log to be measured in a single pass within the borehole. This advancement provided advantages in that drilling rig time devoted to logging was reduced. In addition, some of the depth correlation problems encountered in combining multiple logs made at multiple borehole passes were eliminated. Serious depth correlation problems still exist even though all sensor measurements are made with a single pass of the logging instrument. This topic will be discussed in detail in later sections of this disclosure.

In the intervening years, increasing numbers and types of basic wireline sensors combined with increasingly complex response processing algorithms have been used to obtain new and improved determinations of geophysical parameters of formations penetrated by a borehole and the properties of the borehole. Most sensors used in current wireline technology are very data intensive. When such measurements are made simultaneously with a single pass of a multiple sensor wireline device, massive amounts of raw data are generated per depth interval of borehole traversed. These data are transmitted to the surface of the earth over the logging cable for depth correlation and other subsequent processing to obtain the combination logs of multiple parameters of interest. Current conventional wireline telemetry systems using seven conductor electrical logging cable can telemeter data to the surface at a rate of 500 kilobits to 1000 kilobits per second. Using emerging fiber optic logging cable and telemetry technology, these transmission rates are expected to increase by orders of magnitude. Because of the large telemetry bandwidths available in current and emerging wireline systems, data intensive multiple sensors can be employed and the raw data can be transmitted to the surface for processing. There are situations, however, in which wireline logging systems employ a single conductor cable, either for economic or operational reasons. These cables are often relatively small in diameter and are often required in the logging of wells under high pressure. A single conductor cable limits telemetry band width. Using this type of cable, raw sensor data generated by modern combination logging tools can exceed the telemetry capacity of the system.

The previous background discussion has been directed to wireline type measurements wherein the measurements are usually made after the borehole has been drilled. In some drilling operations, wireline logs are made intermittently during the drilling operation, but such logging requires that the drill string be removed from the borehole prior to logging. Logging after completion of the drilling operation often reveals that the target formation or formations have been missed by either drilling too shallow or too deep. In addition, unexpected zones, such as high pressure formations or salt zones, can be encountered during, and adversely affect, the drilling operation. Such encounters can be quite costly and can be fully analyzed with wireline logging only after the encounter. Intermittent logging is likewise costly in that the drilling operation must cease during logging operations. Possible damage to the borehole can occur during intermittent logging and costly drilling rig time and logging equipment time is wasted during stand-by periods for each operation.

The economic, technical, operational and safety advantages of measuring geophysical parameters as well as drilling management parameters, during the actual drilling of the borehole, was recognized in the early 1950's. Commercial measurements-while-drilling (MWD) became available in the late 1970's and early 1980's. These measurements included directional information and a limited number of formation evaluation type services. Additional sensors and services have been added as MWD technology matures. U.S. Pat. No. 5,250,806 to Erik Rhein-Knudsen et al discloses a MWD apparatus for measuring formation characteristics and is more specifically directed to the simultaneous measurement of neutron porosity and formation density with suitable borehole corrections for each measurement. Methods for downhole depth correlation and resolution matching are not addressed. In many respects, the sophistication of MWD sensors are comparable to their wireline counterparts in spite of the harsh environment experienced in using such sensors in the drilling environment. It is feasible, at least in principle, to utilize multiple sensor, data intensive, combination logging methods developed for wireline tools to obtain new and improved parametric measurements while drilling. Furthermore, it is feasible, in principle, to utilize additional sensors responding to drilling related parameters simultaneously with formation evaluation type sensors. In practice, however, the combination of multiple sensor response techniques, comparable in sophistication to corresponding wireline applications, is limited by current MWD telemetry rates and downhole storage capacities. The simultaneous transmission of drilling dynamics sensor information such as directional information, weight on the drill bit, and other non-formation evaluation type measurements further overloads current MWD telemetry transmission rates which are of the order of 2 to 60 bits per second. Furthermore, it is not feasible to store copious amounts of raw sensor data downhole for subsequent retrieval and processing due to relatively limited storage capacity of current MWD systems. MWD means for making formation evaluation combination logs comparable to current wireline logs require the computation of the desired parameters downhole, and the transfer of the computed parameters of interest to the surface. By using downhole computational means and methods, the transmission requirements are reduced by orders of magnitude in that only "answers" are telemetered, or alternately stored, rather than raw data. This type of downhole computation is also applicable to other types of non formation evaluation type measurements such as signals indicative of the operational characteristics of the downhole equipment as well as measurements indicative of drilling direction and efficiency. Furthermore, downhole processing is applicable to wireline systems with limited telemetry capacity.

Attention is again directed to depth correlation of multiple sensors conveyed along the borehole within a single downhole subassembly. It is virtually impossible to position all sensors in the same plane intersecting the downhole subassembly perpendicular to the axis of the borehole. The varying dimensions of different types of sensors as well as associated power and control circuitry require that multiple sensors be positioned axially along the major axis of the downhole subassembly which is parallel with the axis of the borehole. With the downhole subassembly positioned at a given depth within the borehole, each sensor is responding to a different depth interval of formation penetrated by the borehole. Using terminology common in the industry, each sensor has a different "measure point". Furthermore, the physics of many types and classes of sensors introduce different "effective" measure points. Nuclear detectors such as thermal neutron devices and scatter gamma ray devices used to obtain porosity and density measurements comprise a nuclear source and one or more radiation detector spaced axially from the source. The sensors respond primarily to formation between the source and the one or more detectors. The effective measure point is, therefore between the source and detectors. Likewise, electromagnetic and acoustic sensors often comprise multiple, axially spaced, transmitters and receivers with the effective measure point lying within the axial within the axial array. Even electromagnetic sensors comprising a single transmitter and a single receiver with the transmitter operating at multiple frequencies can exhibit different effective measure points within a given formation. The effective measure point is not usually at the mid point of the axial array and, in fact, can vary with the type of intervening formation and/or the environmental conditions of the borehole such as the mud weight.

In combining the responses of multiple sensors to obtain one or more parameters of interest, variations in the vertical resolutions of the various sensors must be also addressed as well as variations in effective measure points. Some sensors respond rapidly as a formation bed boundary is crossed while others respond more slowly. Vertical resolution is governed by many factors including the physical arrangement of the sensor, the basic physics of the sensor and the physical properties of the formation and borehole environment being traversed. As an example, a measure of formation photoelectric factor will exhibit better defined or "sharper" vertical resolution than a formation bulk density measurement even though the same gamma ray source and gamma ray detector are used to make both measurements. Unless vertical resolutions of all sensors are matched or otherwise processed, parameters computed from the combined responses of multiple sensors will be erroneous, especially in intervals of rapidly changing geology such as laminated sand-shale sequences.

The above discussion of sensor measure points, effective measure points and vertical resolution is applicable to both wireline and MWD devices. U.S Pat. No. 5,282,133 to Charles C. Watson teaches adaptive filtering and deconvolution of primarily gamma ray spectra in obtaining optimum measures of bulk density and formation photoelectric factor; however these teachings are directed toward wireline measurements. Effective measure points of all sensors responses from a downhole subassembly must first be shifted or correlated to a common reference point along the axis of the downhole subassembly before meaningful combination logs can be computed. The common reference point is preferably selected to be near the midpoint of the multiple sensor array. The depth reference point is defined as the depth within the borehole at which the common reference point of the subassembly is positioned. Vertical resolutions of all sensors are also normalized to a common value as will be detailed in subsequent sections of this disclosure. If the effective measure points and vertical resolutions of the sensors are not properly correlated to a common reference, erroneous combination logs will result especially in the regions of bed boundaries where one or more sensors may be responding to one formation and the remaining sensors may be responding to different formations.

Before discussing the depth correlation of multiple sensor measurements, a brief background of techniques used to measure the depth of the downhole subassembly as well as the movement of the subassembly within the borehole will be provided. In wireline measurements, the depth of the down hole subassembly or logging "sonde" is determined by passing the logging cable over a calibrated measure wheel at the surface of known circumference. Often, the stretch of the cable is compensated for by the use of a microprocessor which uses as an input the length of cable in the borehole, the weight of the cable in the borehole, the weight of the sonde and even the history of the cable whose stretch characteristics can change with usage. Logging speed is also determined by the rate of rotation of the calibrated measure wheel. In MWD operations, the depth and rate of penetration of the downhole subassembly is determined from a calibrated measure wheel which contacts the drill string at the surface. If logging sondes and downhole MWD subassemblies were conveyed smoothly along the borehole, multiple sensor responses could be correlated, at least to a first order of approximation, by simply shifting all sensor responses measured as a function of depth to a common reference point using the known physical spacings of the sensors and an assumed or computed effective measure point of each sensor. In practice, however, logging sondes and downhole MWD assemblies are not conveyed smoothly along the borehole. In wireline logging, which is usually performed with the sonde being conveyed up hole, the sonde often sticks within the borehole and subsequently releases or "jumps" as the cable is retrieved. Although the surface measure wheel indicates a constant velocity, the logging sonde and sensors therein are actually moving sporadically up the borehole. In MWD operations, the drill bit and nearby sensor subassemblies often "bounce" as the borehole is being drilled. Even though the surface measurement indicates a constant rate of penetration, the sensors are likewise moving sporadically down the borehole. First order sensor depth correlations mentioned above can be erroneous since each sensor measurement is recorded as a function of depth using depth measurements made at the surface. As an example, assume that two axially spaced sensors are sensing two different formations. Further assume that the lower sensor is in a thin formation bed and the upper sensor is in a relatively thick formation bed. If the sensors sporadically drops within the borehole, the upper sensor could move past the thin bed at an abnormally high velocity and obtain an abnormally small number of measurements within the this bed. The upper sensor could conceivably drop through the thin bed and obtain no measurements within the thin bed. If the surface measurement indicates a constant sensor array velocity, the log produced by the second sensor will indicate an abnormally thin formation bed or, conceivably indicate no bed if the second scenario is encountered. Any combination log computed from the combination of the two sensors responses would obviously be erroneous in the vicinity of the thin bed unless depth correlation methods are designed to handle such situations.

Resolution matching was originally accomplished in the prior art by "smearing" vertical resolutions to the sensor exhibiting the poorest vertical resolution. Although simple to execute, the obvious disadvantage of this technique is that logs of computed parameters exhibit vertical resolution no better than the poorest resolving sensor in the combination array. Deconvolution techniques based upon model sensor responses are now employed to enhance resolution of the poorer resolving sensors thereby yielding computed log response with significantly improved vertical resolution. Deconvolution algorithms are a function, to some extent, of the borehole and formation environment in which the sensors are operating. In order to obtain maximum vertical resolution enhancement through deconvolution, a continuous update of deconvolution parameters based upon current environmental conditions is desirable.

The correlations of depth and vertical resolution of multiple wireline sensors are performed at the surface in the prior art. Raw response data from each sensor, which exhibits the maximum vertical resolution from that sensor, is telemetered to the surface and first recorded as a function of depth as measured by the calibrated measure wheel. Assuming that the downhole geology is varying, each raw sensor response log will exhibit characteristic excursions or "signatures" as a function of depth. Various correlation techniques are used to correlate the response signatures as will be discussed in a following section. Should the sensors be moving along the borehole at a velocity as indicated by the calibrated measure wheel, depth correlation will comprise simple depth shifts to align the effective measure points to a common reference point. Should the sensors be actually moving sporadically along the borehole, correlation will be required to "stretch" or "shrink" as well as depth shift the individual raw sensor responses logs for reasons cited and illustrated previously by example. Once the raw sensor response logs have been properly depth correlated and aligned with respect to resolution, combination logs of parameters of interest are computed and exhibited as a function of measured depth which is usually the depth reference point as previously defined. The above discussion assumes, of course, that the wireline telemetry bandwidth is sufficient to handle the transmission of raw data logs from all sensors to the surface.

In principle, the methods of wireline sensor correlation can be applied to the response of multiple MWD sensors. The application of these wireline techniques to MWD measurements has been prevented, however, by limited telemetry and downhole data storage capacity of current MWD systems, Using current MWD telemetry and storage capacity, raw sensor measurements exhibiting suitable vertical resolution can not be telemetered to the surface for correlation or, alternately, stored downhole for subsequent retrieval and processing. This disclosure is directed toward overcoming these problems so that MWD multiple sensor measurements can be properly correlated downhole n order to provide combination logs of maximum accuracy, precision and vertical resolution.

SUMMARY OF THE INVENTION

The current invention is directed toward the use of a downhole computer and buffer storage within a MWD downhole subassembly to process data from the response of a plurality of sensors of different type. Alternate embodiments of the invention include wireline operations in which telemetry band width is limited by components such as a single conductor logging cable. Classes or types of sensors applicable to the invention include, but are not limited to, electromagnetic, acoustic, and nuclear.

Sensor measurements are made essentially simultaneously. First, the sensor responses are correlated to a common reference point and reference vertical resolution. This correlation is performed using downhole models of the sensor responses stored within a first downhole storage means along with downhole computing means. In one embodiment, response models are computed theoretically or are determined from sensor responses measured in test facilities with known environmental conditions. These sensor response models are initially stored within the first downhole storage means. As an alternate embodiment, sensor response models are calculated while drilling using the downhole computer and sensor responses in portions of the borehole where conditions are known. These models are then stored in the first downhole storage means and subsequently used for correlation in the portions of the borehole in which conditions are unknown. The depth and resolution correlated sensor responses are then processed, using combination sensor response models stored within the first storage means along with downhole computing means to obtain logs of formation parameters of interest as a function of depth within the borehole which is preferably a depth reference point. These computed log parameters are then transmitted to the surface by a suitable MWD telemetry system such as a mud pulsed system. In an alternate embodiment, the computed logs are stored in a second downhole data storage means of the MWD system for subsequent retrieval at the surface when the drill string is removed or "tripped" from the borehole. In another embodiment, the answers are both telemetered to the surface and simultaneously stored within the second downhole storage means. In still another embodiment of the invention, a down link communication system is used to update parameters of the sensor response models and combination sensor response models based upon telemetered formation parameters telemetered to the surface. In addition, changes in borehole conditions such as increases or decreases in mud weight are telemetered to the downhole subassembly thereby updating sensor response and combination sensor response models for these changes in borehole conditions. Both of the example down link communications result in combination logs with maximized accuracy and vertical resolution as will be detailed in subsequent sections of this disclosure.

The computer, buffer storage, first storage means, and second storage means are located within a MWD subassembly which is preferably located in the general vicinity of the drill bit. Sensors are also preferably located within the downhole subassembly as well as power supplies to furnish power to the computer, sensors, and control circuitry. In addition, the sensors are axially spaced along the axis of the downhole subassembly which is parallel to the axis of the borehole. The downhole subassembly is preferably a drill collar. For purposes of definition, the term "sensor" includes both the transmitter and receiver components for acoustic and electromagnetic sensors and nuclear source and detector for induced nuclear sensors.

Raw responses from each sensor are collected over a relatively short depth interval which might be five to ten feet of borehole. These data are stored temporarily as a function of depth within the buffer storage and then retrieved and correlated, using the stored sensor response models and downhole computer, to a common depth and resolution reference point using sensor response models initially stored, or calculated downhole and subsequently stored, within a first downhole storage means and suitable correlation techniques. Correlated sensor data are next combined using the stored combination response model and the down hole computer to obtain the computed log parameters of interest. The resulting computed log parameters of interest are then telemetered to the surface where they are recorded as a function of the reference measure point of the sensor array. Alternately, the parameters of interest are stored within downhole memory as a function of depth for subsequent retrieval at the surface. The entire process is repeated sequentially as the sensor array is conveyed along the borehole. That is, the data array stored within the buffer is continually updated by the addition of new measurements while the least current elements of the array are discarded.

It should be noted that the MWD systems acquires data as a function of time rather than depth using the embodiment with no down link communication between the surface and downhole subassemblies to transmit previously discussed depth measurements acquired at the surface. In using the current invention in this embodiment, the correlation of raw sensor measurements and the computation of parameters of interest must be performed in the time domain and then converted to the depth domain when the parameters of interest are transferred to the surface either by telemetry or storage and subsequent retrieval. Alternately, raw sensor response can be collected and processed in the depth domain as originally described. This requires the use of a two way MWD telemetry system. Depth and rate of penetration information measured at the surface is telemetered to the downhole subassembly thereby allowing the conversion of data processing from the time to the depth domain. As mentioned previously, the down link communication system can be used to update sensor response model parameters and sensor combination model parameters thereby improving the combination logs.

As discussed previously, depth correlation of multiple sensor responses not only involves depth shifting to a common measure point but also requires vertical resolution matching of responses either resulting from sporadic movement of the sensors along the borehole or from inherent differences in vertical resolution of the sensors. In situations where sensor movement is so sporadic that one or more sensors can bypass a thin bed without obtaining any measurements, extrapolation techniques must be used or synthetic data must be generated. Synthetic data are generated from the combination of stored response models of the sensors which obtained no measurements within the bed and response models of the sensors which obtained measurements within the bed. An alternate solution to the latter problem is simply to indicate that no combination parameters could be computed in the bed with missing data. Such missing data is denoted as "no record" in seismology.

Advantages of the invention over prior art MWD systems are significant. One advantage is that raw data from a plurality of sensors can be correlated downhole to a reference point by using downhole buffer storage and computational means. Raw data can be depth correlated to a resolution approaching the inherent resolution of the sensors thereby greatly improving the accuracy and precision of subsequently computed combination logs. This feature is especially important in working in formations with thinly bedded zones. Prior art systems require that raw data be either telemetered to the surface for correlation or stored downhole for subsequent retrieval and correlation. Because of limited telemetry and storage capacity of current MWD systems, the vertical resolution of the telemetered or stored raw sensor data must be much coarser than the inherent vertical resolutions of the sensors. As a result, much vertical resolution is lost in subsequently computed combination logs. A further advantage of the current invention is that the downhole computational means can be used to directly compute the parameters of interest of the combination logs from downhole correlated raw sensor responses. Since the number of computed parameters or "answers" per unit depth of borehole is much smaller than the corresponding amount of raw sensor data used in the computation, usage of limited telemetry and storage capacity is further optimized by transferring only "answers" rather than raw data to the surface. When operating in the telemetry mode, the current invention can provide more computed log parameters with vastly improved vertical resolution. This feature is very important when the formations of interest comprise thinly laminated beds such as hydrocarbon bearing sand-shale sequences. A further advantage of the current invention is that additional parameters can be telemetered to the surface in real time since previously discussed downhole correlation and computational means conserve available telemetry capacity. These additional parameters might include drilling dynamics measurements or the operational status or "health" of all downhole measuring systems. This reduces drilling costs and insures that measured data and resulting computations are valid. A still further advantage of the current invention is that, when embodied with down link telemetry, changes such as variation in mud weight can be used to update sensor response model and combination sensor model parameters yielding more accurate combination logs with maximized vertical resolution. A further advantage of the current invention is that it is applicable to wireline systems which have limited telemetry band width such as those employing a single conductor logging cable. Additional advantages of the current invention will be defined and become apparent in following sections of this disclosure.

BRIEF DESCRIPTION OF THE DRAWINGS

So that the manner in which the above cited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of the invention and are therefore not to be considered limiting of its scope, for the invention may add to other effective embodiments.

DETAILED DESCRIPTION OF THE PREFERRED EMBODIMENT

Figure 1:
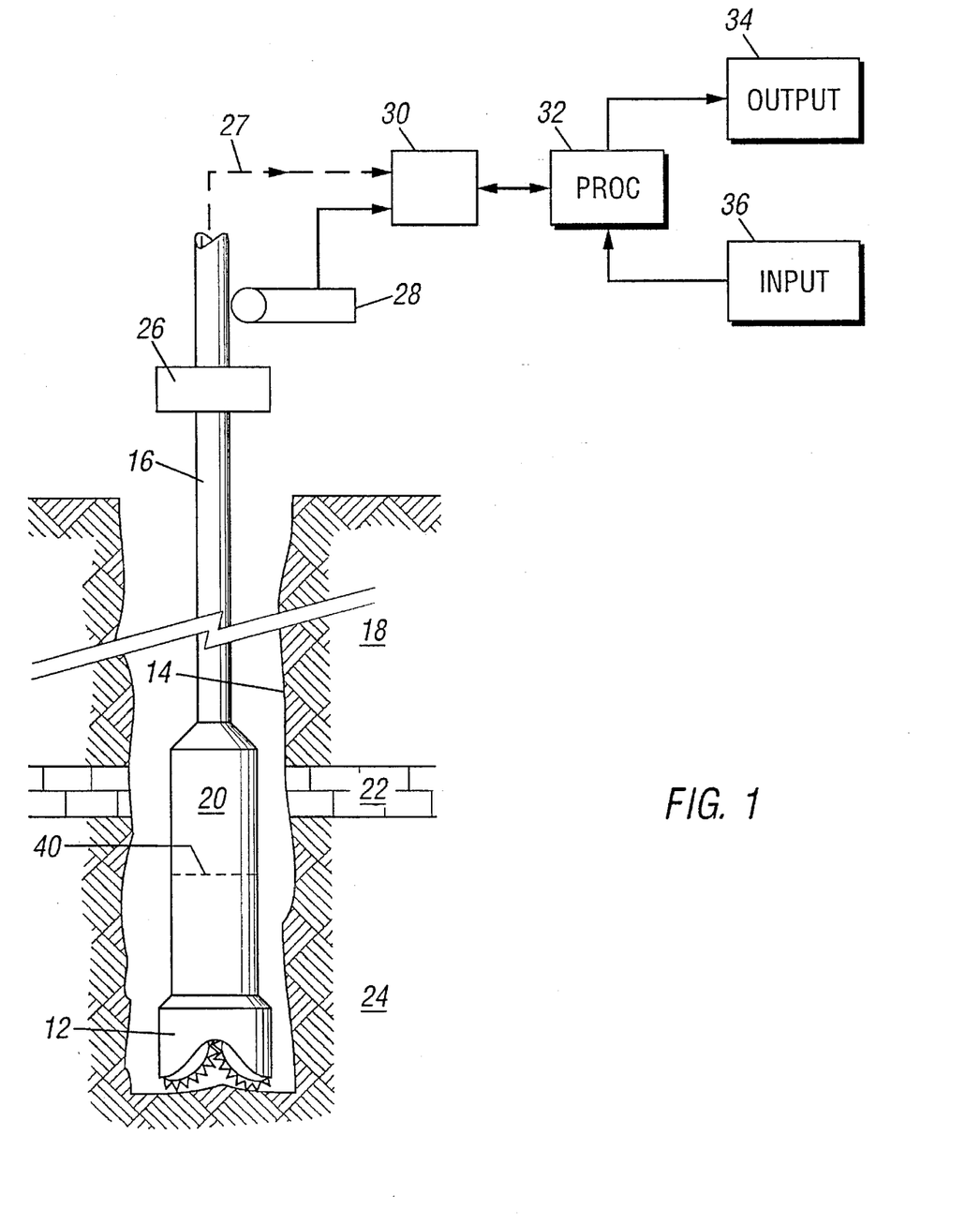
FIG. 1 depicts an overview of the invention in an MWD environment.

Attention is first directed to FIG. 1. which depicts the invention in a MWD embodiment The downhole subassembly 20 is suspended within borehole 14 by the drill string 16. In the preferred embodiment, the subassembly 20 is position as close as practical to the drill bit 12. The drill string is rotated by a kelly depicted by the numeral 26. The power source to drive the kelly as well as many other components of the surface drilling rig are not shown in order to clearly disclose the key elements of the invention. Data are telemetered from the downhole subassembly to an uphole telemetry element 30. The telemetry system can comprise one or more types of drilling fluid or "mud" pulse systems which are well known in the art. The data telemetry path is indicated by the broken line 27. Data from the downhole subassembly 20 are received by the up hole telemetry element 30 and passed to a surface processor 32. The processor controls the output 34 such that the parameters of interest are recorded and displayed in the desired manner which is usually a plot of the parameters of interest as a function of depth within the borehole at which they are determined. The processor 32 also receives data from the input element 36 which is telemetered downhole to subassembly 20 as will be discussed in subsequent sections. The processor 32 also receives depth information from the depth measure wheel and associated circuitry depicted by the numeral 28.

The borehole 14 is shown as penetrating relatively thick formations 18 and 24 on either side of a relatively thin zone 22. This situation has been discussed earlier as well as the problems associated with measurements computed from multiple sensor responses should the sensors pass sporadically across such bedding. The effective measure point of the subassembly 20, as defined previously, is indicated by the numeral 40.

Figure 2:
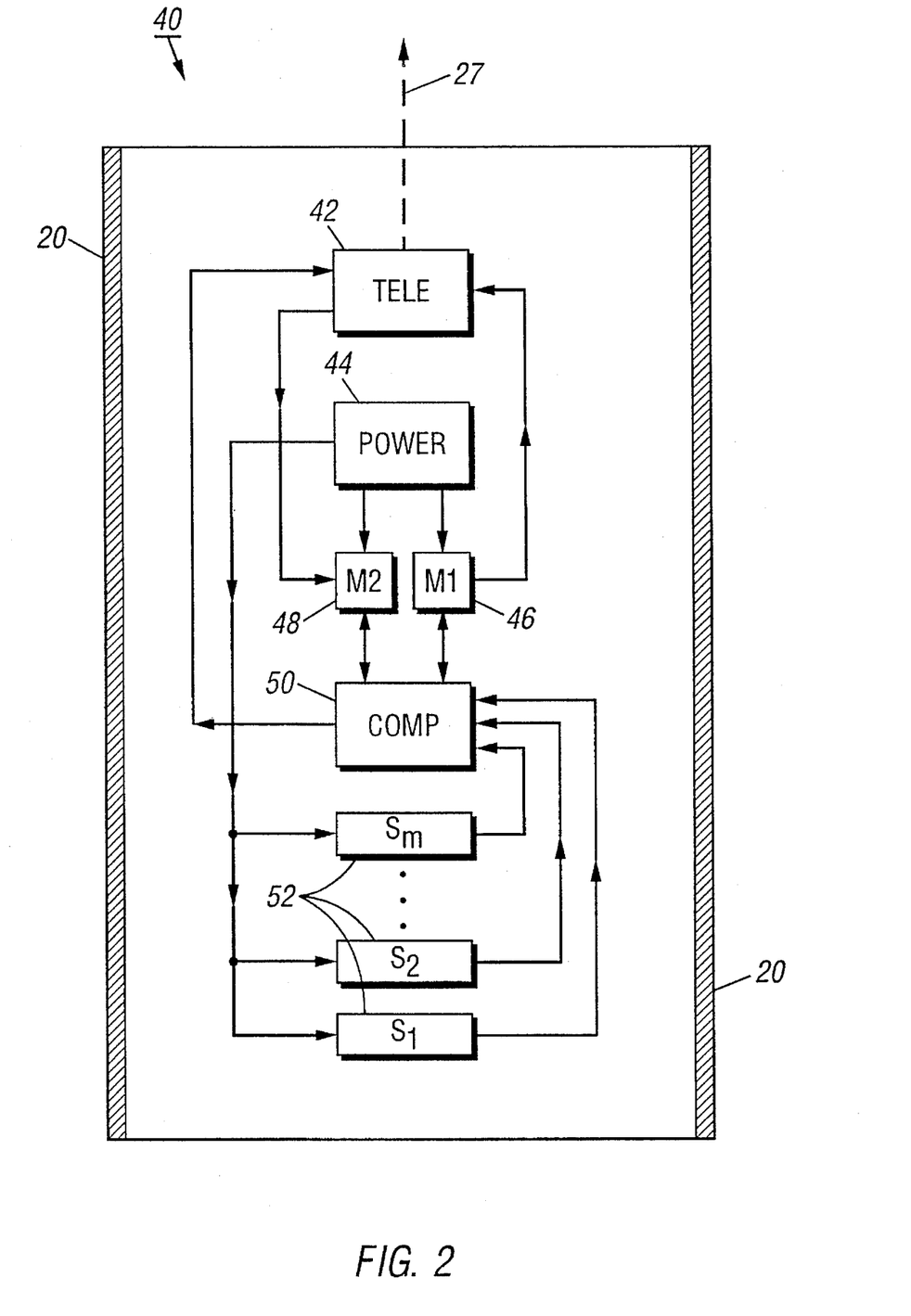
FIG. 2 illustrates in block diagram form the key elements of the downhole subassembly.

FIG. 2 illustrates in block diagram form the major elements of the downhole subassembly 20 and further illustrated with arrows the paths of cooperation between the various elements. It should be understood that FIG. 2 illustrates only one physical arrangement of the elements and one system for cooperation between the elements. Other equally effective arrangements can be utilized to successfully practice the invention.

A plurality of m sensors of one or more types arranged axially within the subassembly are identified by the numeral 52. A predetermined number of discrete data points output from the sensors 52 are stored within a buffer which, in FIG. 2, is included as a partitioned portion of the memory capacity of the computer 50. Alternately, the buffer storage means can comprise a separate memory element (not shown). The sensor response relationships or "models" are stored within memory means 48. A two way communication link exists between the memory 48 and the computer 50. The responses from sensors 52 are transformed into parameters of interest within the computer 50 using methods which will be detailed in the following section. The parameters of interest are then passed to the down hole portion of the telemetry system 42 and subsequently telemetered to the surface as illustrated generally by the broken line 27. The power sources 44 supply power to the telemetry element 42, the computer 50, the memory modules 46 and 48 and associated control circuits (not shown), and the sensors 52 and associated control circuits (not shown).

Attention is now directed toward correlation and resolution matching of the responses of one or more sensors within downhole subassembly 20. Depth shifting will first be addressed and then resolution matching. Depth shifting accomplishes two purposes which are (1) the alignment of measure points of axially spaced sensors such that the sensor responses can be properly combined to obtain parameters of interest and (2) the measure of rate of penetration (ROP) of the bit 12 using only data obtained and processed downhole. Excursions of sensor responses to varying environmental conditions are a necessary condition for depth correlation. Responses of different types of sensors can be used in some situations for correlation, as will be subsequently illustrated. Correlation is, however, not possible if one sensor responds to a change in geophysical conditions while another sensor does not. As an example, the response of a gamma ray sensor would not change appreciably in crossing an oil/salt water interface within a sand of constant porosity. The response of a resistivity sensor would, however, vary significantly when crossing the interface. As a result, there would be no correlation across the oil/water interface. The crossing of a sand/shale interface by the two types of sensors would, in all probability, yield excellent excursions of both types of sensors. To obtain the maximum vertical density of correlatable excursions, It is preferable to use responses from the same types of sensors for depth correlation purposes.

Figure 3A:
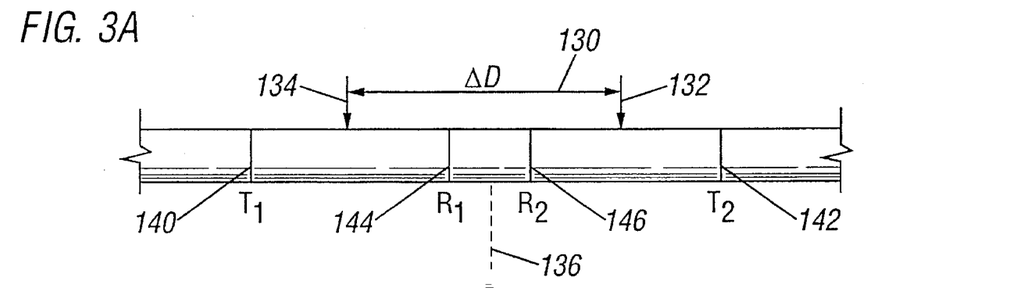
FIGS. 3A–3D depict in graphical form the depth correlation of two axially spaced electromagnetic sensor arrays, with each sensor exhibiting the same vertical resolution.

FIG. 3A depicts a portion of the downhole subassembly 20 comprising two electromagnetics sensors with each further comprising a transmitter and a receiver. The transmitter 140 and the receiver 144 comprise the first sensor with a measure point illustrated by the arrow 134. The transmitter 142 and the receiver 146 comprise the second sensor with a measure point illustrated by the arrow 132. The transmitter-receiver spacings for both sensors are the same for purposed of illustration. The separation of the two sensor measure points is defined as $\Delta D$ and is identified by the numeral 130. FIG. 3A illustrates an actual sensor pair used in an MWD system where $\Delta D$=39 inches.

Figure 3B:
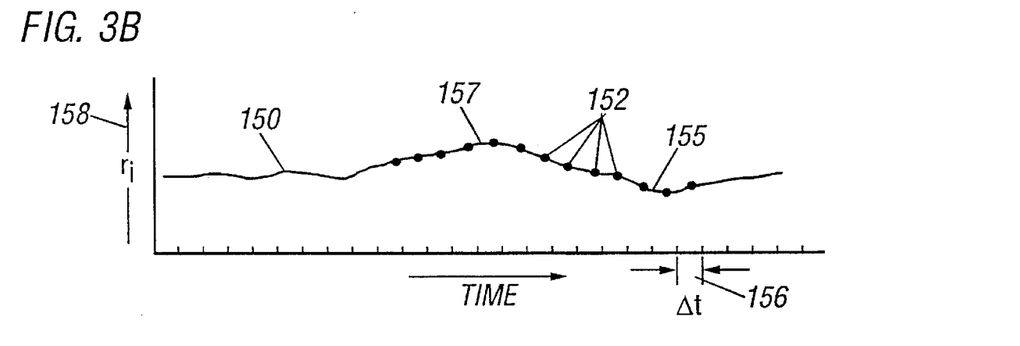
Figure 3C:
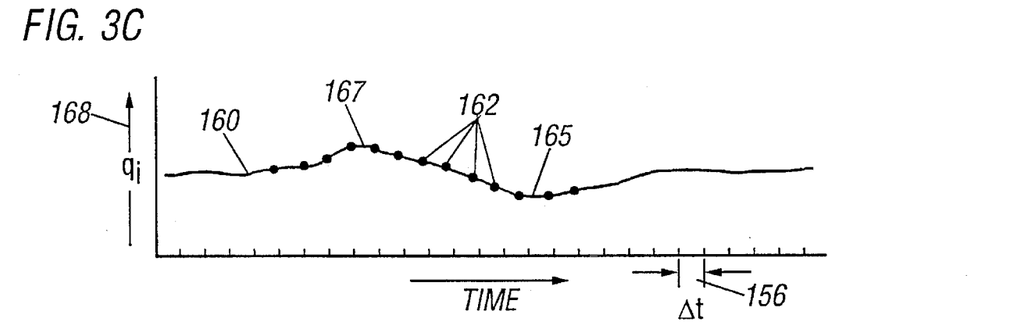

It should be recalled that generally sensor responses of MWD systems are initially measured as a function of time. The response, $r_i$, of the first sensor array is plotted as a function of time in FIG. 3B. The response is depicted as a curve 150 with excursions identified by the numerals 157 and 155. Data over N discrete time intervals $\Delta t$, illustrated by the numeral 156, are collected and stored within the previously defined buffer storage means. The data $r_i$ are, therefore, discrete measures represented by the points 152 plotted at the mid point of each corresponding time interval $\Delta t$. In the illustrated example, $\Delta t$ represents a time interval of 100 seconds. The response $q_i$ of the second sensor is shown in FIG. 3C as curve 160 plotted as a function of time. The curve 160, like curve 150, is actually an array N of discrete measurements 162 over time intervals $\Delta t$ depicted by the numeral 162 and are likewise stored within the buffer memory. Excursions 167 and 165 correspond to the excursions 157 and 155 of curve 150, but occur at earlier times since the subassembly 20 is moving downhole during drilling and the second sensor "leads" the first sensor. For purposes of illustration, it will be assumed the N and $\Delta t$ are the same for both the first and the second electromagnetic sensors although this is not a necessary condition for processing data according to the methods of the invention. Because of the different measure points 134 and 132 of the first and second sensors, respectively, all excursions of curve 150 will be displaced from corresponding excursions on curve 160 by a time differential $\Delta T$, assuming that the ROP is constant over the correlated interval.

The next step in the data processing sequence is to correlate the responses of the two electromagnetic sensors which, in this particular illustration, are still recorded in the time domain. Many correlation techniques can be used but the well known cross correlation technique is presented as the preferred embodiment. The normalized cross correlation coefficient, C(j), is given by the relationship $$C(j) = \sum_{i=1}^{N} (r_i q_{i-j}) \left( \sum_{i=1}^{N} r_i^2 \times \sum_{i=1}^{N} q_i^2 \right)^{1/2} \quad (1)$$

where C(j)=1.0 for exact correlation and C(j)=0.0 for no correlation of the data $r_i$ and $q_j$. The N incremental measurements $r_i$ and $q_j$ are recalled from the buffer and C(j) is computed for each possible combination. Defining $j_{max}$ as the index for which C(j) is maximized, then $$\Delta T = j_{max} * \Delta t \quad (2)$$

Figure 3D:
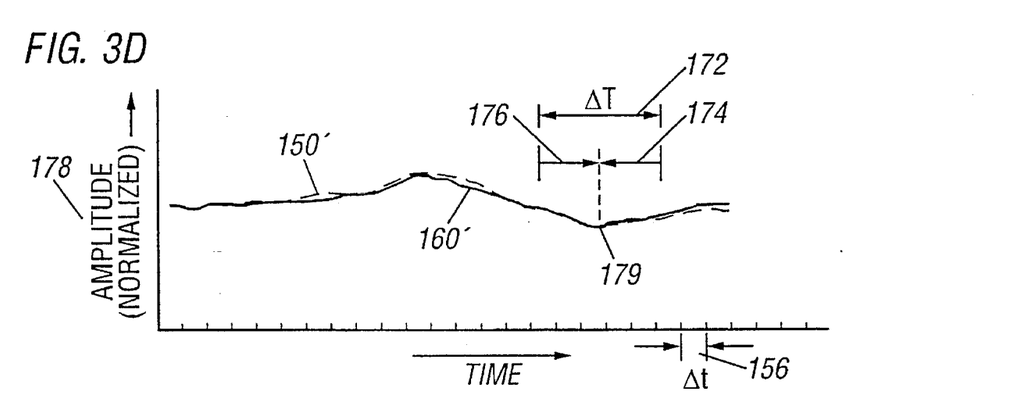

By shifting curve 160 to the right by $\Delta T/2\Delta t$ time increments and by shifting curve 150 to the left by $\Delta T/2\Delta t$ time increments, the curves are correlated in the time domain. This step is illustrated in FIG. 3D where the shifts of curves 160 and 150 are designated by the numerals 176 and 174, respectively, and $\Delta T$ is denoted by the numeral 172. It should be noted that for purposes of illustration, the amplitudes of the curves have been normalized at a value in time denoted by the numeral 179. This normalization is only to illustrate the high degree of correlation. The lowest values of $r_1$ and $q_1$ are then discarded as the subassembly traverses the borehole over the time interval $\Delta t$ and new values of sensors measurements $r_{N+1}$ and $q_{N+1}$ are added to the buffer storage forming a new data set of N values for each sensor. This procedure is repeated as the subassembly 20 is conveyed along the borehole.

Several observations are appropriate at this point of the data processing sequence. For the example of FIG. 3, $\Delta T$=505 seconds. The incremental velocity $\Delta v$, which is defined as $$\Delta v = \Delta D / \Delta T \quad (3)$$

is computed for each increment $\Delta t$ since $\Delta D$ is a known design parameter of the subassembly and $\Delta T$ is measured. Over the correlation interval illustrated in FIG. 3, ROP=$\Delta v$= 39/505=0.0772 inches/second=23.2 feet/hour which agrees with the ROP measured at the surface to within three significant digits. Should the ROP change significantly, the sample intervals $\Delta t$ and the number of measurements N collected for correlation can be changed automatically without commands from the surface. As an example, if the ROP increases significantly, it might be desirable to reduce $\Delta t$ to increase the resolution of excursions and thereby optimize the sensor cross correlation. The computer 50 is programmed to automatically vary N and $\Delta t$ based upon downhole computations of $\Delta v$ without commands from the surface.

Figure 5A:
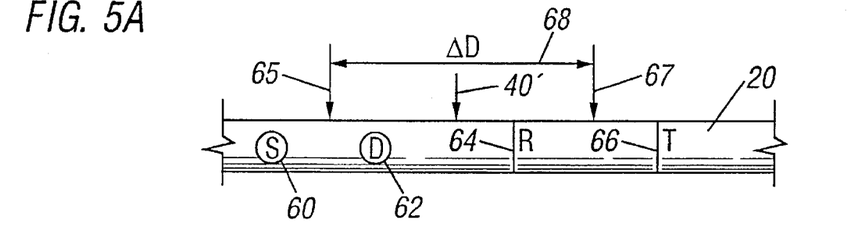

The matching of vertical resolutions of multiple sensors is next addressed. For reasons stated previously, the vertical density of correlatable excursions is largest for sensors of the same type. One of the primary applications of the invention is, however, the combination of sensors of different types to obtain parameters of interest. Resolution matching will, therefore, be illustrated using responses of two detectors of different types. FIG. 5A depicts a portion of the downhole subassembly comprising a nuclear sensor and an electromagnetic sensor. Only two sensors are used to illustrate this step of data processing although it should be understood that the techniques to be described are applicable to any number of sensor responses. The nuclear sensor comprises a nuclear source 60 and a nuclear detector 62. The effective measure point of the nuclear sensor array is denoted by the arrow 65. The electromagnetic sensor used in the example comprises a single transmitter 66 and a single receiver 64. The effective measure point for the electromagnetic sensor array is denoted by the arrow 67. The two effective measure points are displaced axially along subassembly 20 by the known distance, again defined as $\Delta D$ identified by the numeral 68.

Figure 5B:
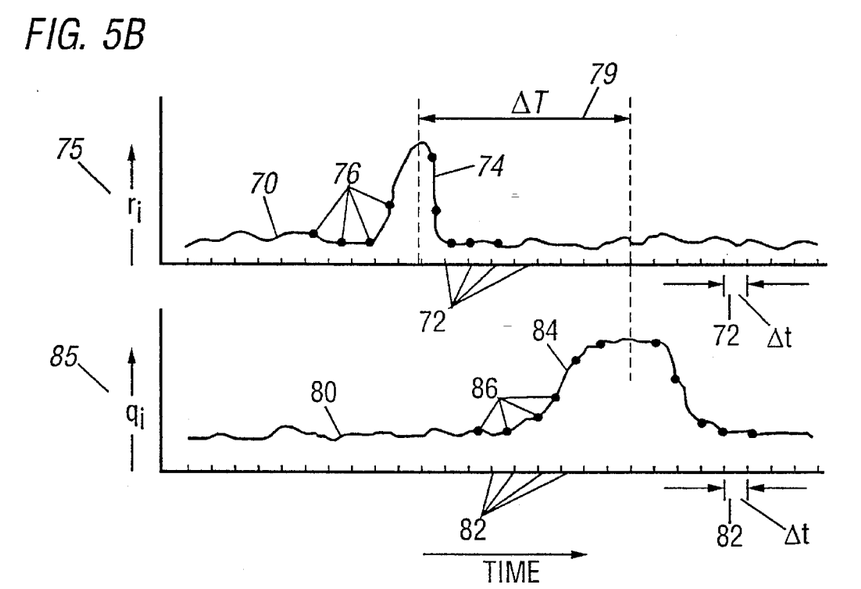

Using the nomenclature of the previous example, the response, $r_i$, of the nuclear sensor is plotted as a function of time in FIG. 5B. The response is depicted as a curve 70 with a major excursion 74 induced possibly by a thin formation 22 as illustrated in FIG. 1. Data over N discrete time intervals $\Delta t$, where $\Delta t$s are illustrated by the numeral 72, are collected and stored within the previously defined buffer storage means. The data $r_i$ are again discrete measures represented by the points 76 plotted at the mid point of each corresponding time interval $\Delta t$. The response $q_i$ of the electromagnetic sensor is likewise shown in FIG. 5B as curve 80 plotted as a function of time. An excursion 84 is depicted which exhibits poorer vertical resolution than the nuclear sensor across the same geological feature. The curve 80, like curve 70, is actually an array N of discrete measurements 85 over time intervals $\Delta t$ depicted by the numeral 82 and are likewise stored within the buffer memory. For purposes of illustration, it will again be assumed that N and Δt are the same for both the nuclear and electromagnetic sensors although this is not a necessary condition for processing data according to the methods of the invention. Because of the different measure points 65 and 67 of the nuclear and electromagnetic sensors, respectively, the excursions 74 and 84 are displaced by a time differential ΔT denoted by the numeral 79.

Figure 5C:
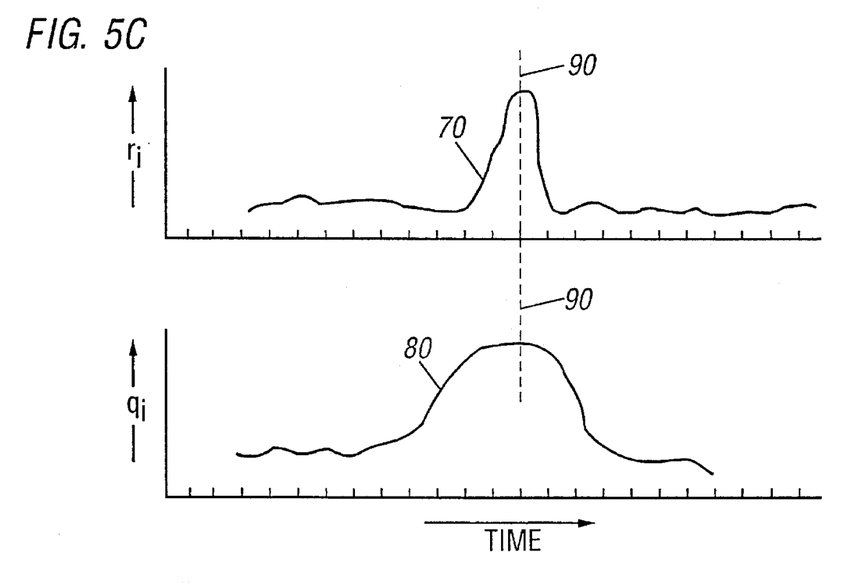

The next step in the data processing sequence is to depth shift the responses of the nuclear and electromagnetic sensors using the cross correlation described in the previous example. Results of depth shifting are illustrated in FIG. 5C where the line 90 denotes a time which corresponds to the effective measure point of the combine sensor array in the depth domain.

As mentioned previously, it is preferred to resolution match multiple sensors with the sensor response data in the depth domain. Absolute depth can be supplied to the downhole computer at several stages of the drilling operation. As examples, absolute depth can be supplied each time the mud pump is cycled, or each time the drill bit is tripped, or both. The preferred method is to supply absolute depth information each time the mud pump is cycled which, of course, occurs each time a joint of drill pipe is added to the drill string and possibly more often. Subsequent incremental depth commands based upon the readings of the surface depth indicator 28 are telemetered down to the computer by means of the computer down link element 30. These incremental depth signals are used to update surface entered absolute depth values thereby allowing downhole sensor readings to be converted from the time domain to the depth domain with a reasonable degree of accuracy. Being incremental depth indications, these signals are not data intensive and can be transmitted downhole using methods well known in the art. Should, however, a relatively long interval occur between trips of the bits, significant error is propagated using the incremental depth measurement technique. For vertical depth shifting and resolution matching purposes, the use of incremental depths rather than absolute depths has been found to be satisfactory. If, however, parameters of interest measured in the drilling well are correlated downhole with reference data from surrounding wells, absolute depth tracking becomes important. This is because the reference data is usually supplied as a function of absolute depth.

Figure 5D:
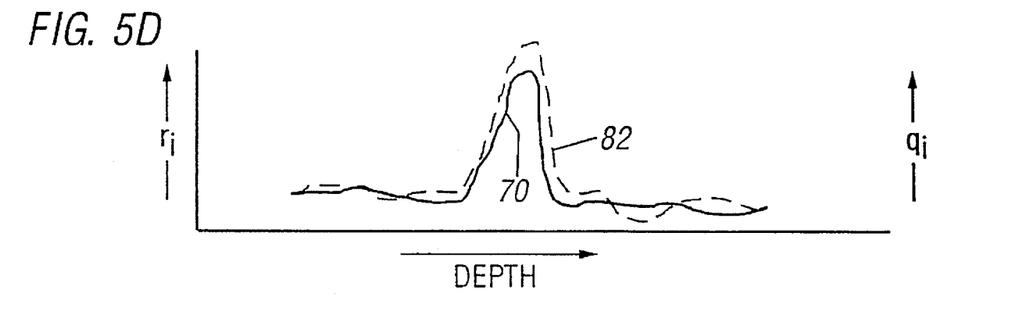
Figure 5E:
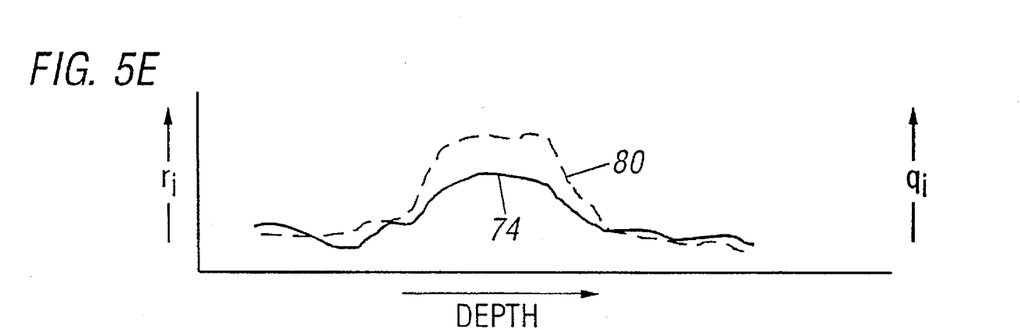

FIG. 5D illustrates the nuclear and electromagnetic sensor data which have been resolution matched by using a response model of the electromagnetic sensor, stored within memory module 48, to "sharpen" the resolution of the electromagnetic sensor as depicted by curve 82 to match the resolution of the nuclear sensor, identified again by the numeral 70. An alternate method which is less computational intensive, but which yields poorer vertical resolution of eventually computed parameters of interest, comprises "smearing" the resolution of the higher resolution measurement to match the resolution of the poorer resolved measurement. In the example under discussion, the response of the nuclear sensor is smeared by averaging a subset of u elements within the larger set N using the relationship $$r'_i = \left( \sum_{i-u}^{i+u} r_i \right) / 2u \quad (4)$$

and plotting the smeared response $r'_i$ at the mid point of depth increment u. The result of this type of resolution matching is shown in FIG. 5E where the vertical resolution of the response of the nuclear sensor 74 has been degraded to match the resolution of the electromagnetic sensor as depicted by curve 80.

At this point, data measured by the sensors 52 have been correlated and resolution matched. Geophysical, drilling dynamics and other parameters of interest are now determined by combining these responses using combination sensor response models which are stored either internally within the computer 50 or within an additional memory module (not shown) contained within the downhole subassembly 20. The computed parameters of interest are telemetered to the surface by means of the telemetry element 42 cooperating with telemetry element 30. Computed parameters of interest are displayed in an appropriate form as a function of depth by output element 34. Alternately, the parameters of interest can be stored downhole within memory module 46 for subsequent retrieval at the surface when the drill string is tripped. An additional option is to both telemeter to the surface and store either all or portions of the computed parameters of interest.

Figure 4:
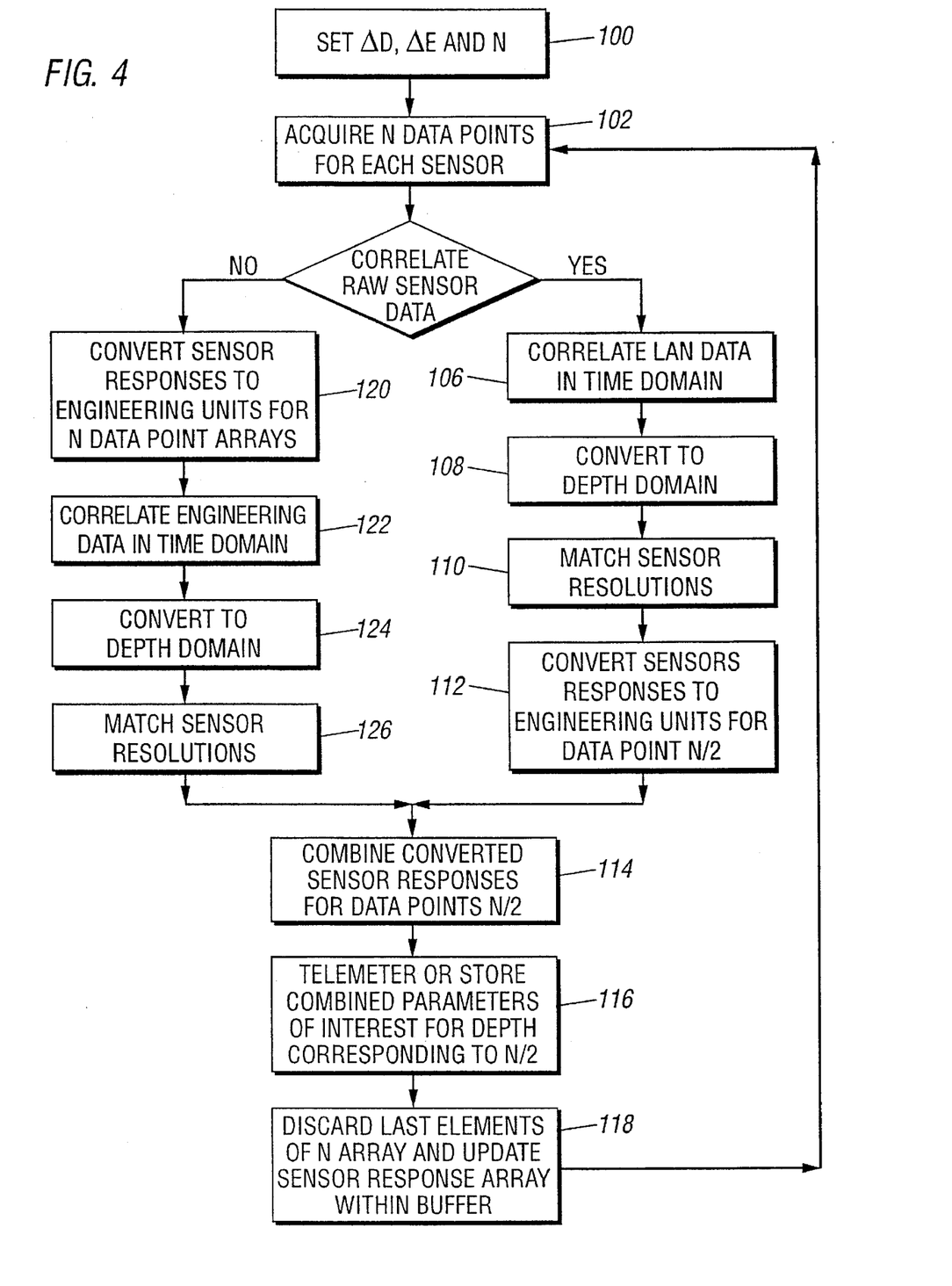
FIG. 4 illustrated the preferred overall data processing method in flow chart form; an FIG. 5A–5E depict in graphical form the depth correlation and vertical resolution matching of two axially spaced nuclear and electromagnetic sensors.

One overall data processing method is summarized in the flow chart of FIG. 4. It should be understood that various steps can be changed and still preserve the spirit of the data processing objectives of the invention. At step 100, the known spacings between the effective points of a plurality of sensors, the number of data points N from each sensor to be stored in the storage buffer, and the incremental time intervals over which raw data will be accumulated are stored in the down hole computer 50. N data points are acquired for each sensor as depicted at step 102. At 104, a decision is made whether to convert the N raw data points into engineering units prior to correlation or whether to correlate raw data. In this context, an "engineering unit" is defined by example using the response of a epithermal neutron porosity sensor. Raw data from the sensor would be counting rate which would exhibit excursions as the formation parameters vary. Apparent formation porosity, computed from measured counting rate using a predetermined calibration relationship (i.e. the sensor response model) between counting rate and porosity, is defined as the sensor response in "engineering" units. Apparent porosity will also yield correlatable excursions. If the decision is made to correlate raw data, which is preferred in that less computing capacity is required, correlation is made at step 106. The correlated data are converted from the time to depth domain at step 108. Sensor resolution is matched at step 110. At step 112, raw sensor data for the N/2 depth point in buffer storage are converted to corresponding engineering units using sensor response model stored in memory module 48. Sensor responses are combined to compute parameters of interest at step 114 for the depth represented by the buffer elements N/2. In an alternate embodiment, step 112 is omitted and raw sensor data are combined directly to obtain the parameters of interest. Parameters are telemetered to the surface or alternately stored downhole for subsequent retrieval at step 116. At step 118, the arrays of N elements for each sensor are updated as the sensors move along the borehole by discarding the "oldest" measurements and adding the most recent measurements. The process is repeated sequentially again starting at step 102. If, at step 104, the decision is made to correlate sensor response in engineering units, sensor responses are converted at step 120 to the corresponding engineering units for each set of N data points in buffer storage. Correlation is performed at step 122 in the time domain and the correlated data are converted to the depth domain at step 124. Sensor resolution is matched at step 126 and the steps depicted in blocks 114 through 118 have been described previously.

While the foregoing is directed to the preferred embodiments, the scope thereof is determined by the claims which follow.

What is claimed is:

1. A system for determining parameters of interest from within a borehole, comprising:
   (a) a downhole subassembly;
   (b) apparatus for conveying the downhole subassembly along the borehole;
   (c) a plurality of sensors positioned within the downhole subassembly;
   (d) a correlation system within the downhole subassembly for correlating responses of a sensor in the plurality of sensors to a common depth reference point and a common vertical resolution to form a set of correlated sensor data, wherein parameters of a correlation model are adjusted based upon the responses of a sensor in the plurality of sensors so as to optimize the correlation to the common depth reference point;
   (e) a computing apparatus within the downhole subassembly for determining the set of correlated sensor data and for transforming the correlated sensor data into the parameters of interest utilizing a sensor combination model; and
   (f) apparatus for transferring the parameters of interest to the surface of the earth.

2. The system of claim 1 wherein the correlation system comprises:
   (a) a buffer for storing a limited amount of sensor response data for correlation;
   (b) a correlation model stored within the computing apparatus;
   (c) a first storage device containing sensor response models for each of the sensors in the plurality of sensors; and
   (d) apparatus for combining data stored in the buffer with the correlation model and sensor response models using the computing apparatus to form the set of correlated data.

3. The system of claim 2, wherein the apparatus for conveying the downhole subassembly along the borehole comprises a drill string and the downhole subassembly is positioned in the vicinity of a drill bit which terminates at the lower end of the drill string.

4. The system of claim 2 wherein the computing apparatus is adapted to determine the sensor response models from sensor responses determined within intervals of the borehole in which environmental conditions are known.

5. The system of claim 2 wherein said apparatus for conveying said downhole subassembly along said borehole comprises a wireline.

6. The system of claim 1 wherein said common depth reference point is a depth within said borehole at which a predetermined depth reference point on said downhole subassembly is positioned.

7. A method for determining parameters of interest from within a borehole, comprising:
   (a) conveying a downhole subassembly having a plurality of sensors along the borehole to obtain unprocessed response data from the sensors in the plurality of sensors;
   (b) correlating the unprocessed response data to a common reference point along an axis of the downhole subassembly and a common vertical resolution so as to form a set of correlated sensor response data, wherein the correlation is adjusted automatically based upon the unprocessed response data to optimize the correlation of the unprocessed response data to the common reference point; and
   (c) combining the correlated sensor response data with downhole stored combination models utilizing a downhole computing apparatus for determining the parameters of interest.

8. The method of claim 7 wherein the correlating step comprises:
   (a) storing within a downhole buffer a limited amount of sensor response data for correlation;
   (b) storing a correlation model within the downhole computing apparatus;
   (c) storing sensor response models for each of the sensors in the plurality of sensors within a first downhole storage device; and
   (d) combining the limited amount of stored sensor response data with the correlation model and the sensor response models by utilizing the downhole computing apparatus to form the set of correlated sensor response data.

9. The method of claim 8 wherein the stored sensor response models are utilized to generate missing sensor response data for a sensor by combining measured sensor responses from a sensor in the plurality of sensors with sensor response models, to compute the parameters of interest within intervals of the missing sensor response data.

10. The method of claim 8 further comprising the step of changing parameters of said sensor response models and said sensor combination models or both by means of down link commands from the surface.

11. The system of claim 8 wherein said sensor response models are computed downhole from sensor responses within intervals of the borehole in which environmental conditions are known.

12. The method of claim 8 wherein said step of forming said set of correlated data comprises the additional steps of:
   (a) depth shifting all of said stored sensor data for each sensor to a common depth reference point using said correlation model; and
   (b) matching the vertical depth resolutions of said stored sensor data for each sensor by vertical deconvolution using said sensor response models.

13. The method of claim 12 wherein said method for depth shifting all said sensor data for each sensor to a common depth reference point comprises cross correlation.

14. The method of claim 7 further comprising determining said parameters of interest as a function of depth within said borehole at which they are determined.

15. A system for determining parameters of interest from within a borehole, comprising:
   (a) a downhole subassembly;
   (b) apparatus for conveying the downhole subassembly along the borehole;
   (c) a plurality of sensors disposed in the downhole subassembly;
   (d) a computing apparatus within the downhole subassembly;
   (e) a correlation system within the downhole subassembly for correlating the responses of sensors in the plurality of sensors to a common depth reference point and a common vertical resolution so as to form a set of correlated sensor data, wherein the correlation system includes
      (i) a buffer for storing a limited amount of sensor response data for correlation,
      (ii) a correlation model stored in the computing apparatus wherein parameters of the correlation model are adjusted by correlating excursions in the responses of the sensors in the plurality of sensors to determine the time interval between passage of two of the sensors past a given point within the borehole,
      (iii) apparatus for dividing a predetermined axial distance between the two sensors by the time interval of passage to obtain a downhole velocity of the downhole subassembly over the time interval of the passage, (iv) apparatus for adjusting the parameters of the correlation model based upon measured downhole velocity, (v) a first storage device containing sensor response models for certain sensors in said plurality of sensors, and (vi) apparatus for combining the data stored in the buffer with the correlation model and the sensor response models utilizing the computing apparatus to form the set of correlated sensor data;

(f) a sensor combination model associated within the computing apparats for transforming the correlated sensor data into the parameters of interest; and (g) apparatus for transferring the parameters of interest to the earth's surface.

16. The system of claim 15 wherein excursions of sensors of the same type and exhibiting the same vertical resolution are used in the adjustment of the parameters of the correlation model.

17. The system of claim 15 wherein the apparatus for transferring the parameters is a telemetry system.

18. The system of claim 15 wherein the apparatus for transferring the parameters includes a data storage apparatus for storing the parameters of interest and for subsequently retrieving the stored parameters of interest at the earth's surface.

19. The system of claim 15 further comprising a telemetry down link between the downhole subassembly and the earth's surface.

20. The system of claim 19 further comprising a depth measure wheel at the earth's surface which transmits incremental depth measures over the telemetry down link and which incremental depth measures are combined with depth measurements stored within the computing apparatus to provide a measure of the absolute depth of the downhole subassembly to the computing apparatus.

21. A method for determining parameters of interest from within a borehole, comprising:

(a) conveying a plurality of sensors and a computing apparatus disposed in a downhole subassembly along the borehole for obtaining unprocessed response data from the sensors in the plurality of sensors;

(b) correlating the unprocessed response data from the sensors in the plurality of sensors to a common reference point along an axis of the downhole subassembly and to a common vertical resolution to form a set of correlated sensor response data, wherein the correlation includes (i) storing in a downhole buffer a limited amount of the sensor response data for correlation, (ii) storing a correlation model in a computing apparatus, wherein parameters of the correlation model are adjusted by correlating excursions in the responses of the sensors in the plurality of the sensors to determine time interval between the passage of two of the sensors in the downhole assembly past a given point in the borehole, (iii) dividing a predetermined axial distance between the two sensors by the time interval between the passage of two of the sensors in the downhole assembly past a given point within the borehole, (iv) adjusting the parameters of the correlation model based upon a measured velocity;

(v) storing a sensor response models in a first downhole storage means, and (vi) combining the limited amount of stored sensor response data with the correlation model and the sensor response models utilizing the computing apparatus to form the set of correlated sensor response data;

(c) combining the correlated sensor response data with stored sensor combination models utilizing the computing apparatus to determine the parameters of interest; and (d) transferring the parameters of interest to the surface.

22. The method of claim 21 wherein excursions of sensors of the same type and exhibiting the same vertical resolution are used in the adjustment of the parameters of the correlation model.

23. The method of claim 21 wherein the parameters of interest are transferred to the surface by telemetry system.

24. The method of claim 23 wherein the downhole subassembly is conveyed along the borehole with a drill string and the downhole subassembly is positioned in the vicinity of a drill bit which terminates the lower end of the drill string.

25. The method of claim 23 wherein the absolute depth of the downhole subassembly is determined by combining a reference depth stored within the downhole assembly with relative incremental depths measured at the surface and telemetered to the computing apparatus.

26. The method of claim 23 wherein the parameters of interest are stored downhole within a second storage device.

27. The method of claim 23 wherein the sensors are conveyed along the borehole by a wireline.

28. Apparatus for use during drilling of a borehole, comprising:

(a) a downhole subassembly;

(b) a plurality of sensors disposed in the downhole subassembly;

(c) a correlation model within the downhole subassembly for correlating responses of a sensor in the plurality of sensors to a common depth reference point and a common vertical resolution to form a set of correlated sensor data, wherein parameters of the correlation model are adjusted based upon the responses of a sensor in the plurality of sensors to optimize the correlation to the common depth reference point; and (d) a computing apparatus within the downhole subassembly for determining the set of correlated sensor data and for transforming the correlated sensor data into parameters of interest utilizing a sensor combination model during drilling of the borehole.

29. A method for determining parameters of interest from within a borehole, comprising:

(a) conveying a downhole subassembly having a plurality of sensors along the borehole to obtain unprocessed response data from the sensors in the plurality of sensors;

(b) correlating the unprocessed response data to a common reference point along the axis of the downhole subassembly and a common vertical resolution to form a set of correlated sensor response data, and wherein the correlation is adjusted automatically based upon the unprocessed response data to optimize the correlation of the unprocessed response data to the common reference point; and (c) determining the set of correlated sensor response data and combining the correlated sensor response data with downhole stored combination models utilizing a downhole computing apparatus for determining the parameters of interest.

* * * * *

UNITED STATES PATENT AND TRADEMARK OFFICE
CERTIFICATE OF CORRECTION

PATENT NO. : 5,581,024

DATED : December 3, 1996

INVENTOR(S) : Wallace H. Meyer, Jr., Ronald J. Deady, Macmillan M. Wisler

It is certified that error appears in the above-indentified patent and that said Letters Patent is hereby corrected as shown below:

Claim 15, line 40, change "apparats" to --apparatus--.

Claim 21, line 28, change "models" to --model--.

Signed and Sealed this

Fifteenth Day of April, 1997

*Attest:*

BRUCE LEHMAN

*Attesting Officer*   *Commissioner of Patents and Trademarks*